(12) United States Patent
Schell et al.

(10) Patent No.: US 9,100,393 B2
(45) Date of Patent: Aug. 4, 2015

(54) SIMULACRUM OF PHYSICAL SECURITY DEVICE AND METHODS

(75) Inventors: Stephan V. Schell, San Mateo, CA (US); Jerrold Von Hauck, Windermere, FL (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/080,533

(22) Filed: Apr. 5, 2011

(65) Prior Publication Data

US 2012/0117635 A1 May 10, 2012

Related U.S. Application Data

(60) Provisional application No. 61/410,298, filed on Nov. 4, 2010.

(51) Int. Cl.

| G06F 7/04 | (2006.01) |
|---|---|
| G06F 15/16 | (2006.01) |
| G06F 17/30 | (2006.01) |
| H04L 29/06 | (2006.01) |
| G06F 9/00 | (2006.01) |
| H04W 8/20 | (2009.01) |
| H04L 29/08 | (2006.01) |

(Continued)

(52) U.S. Cl.
CPC ............ *H04L 63/0853* (2013.01); *G06F 21/34* (2013.01); *H04L 67/34* (2013.01); *H04W 8/183* (2013.01); *H04W 8/205* (2013.01)

(58) Field of Classification Search
CPC ..... H04W 8/001; H04W 8/183; H04W 8/205; H04W 8/20; H04L 63/0853; H04L 67/34
See application file for complete search history.

(56) References Cited

U.S. PATENT DOCUMENTS

| 8,676,180 B2 * | 3/2014 | Srinivasan .................... 455/415 |
| 2001/0039583 A1 * | 11/2001 | Nobakht et al. .............. 709/227 |

(Continued)

FOREIGN PATENT DOCUMENTS

| EP | 1 865 437 | 12/2007 |
| TW | 201012187 | 3/2010 |
| WO | WO2010027765 | 3/2010 |

OTHER PUBLICATIONS

Taiwanese Patent Application No. 100140131—Office Action dated Mar. 6, 2014.

*Primary Examiner* — Tae Kim
(74) *Attorney, Agent, or Firm* — Downey Brand LLP

(57) ABSTRACT

A simulacrum security device and methods. In one embodiment, a simulacrum or likeness of a physical security device is provided for use in conjunction with a software emulation of the security device. In one implementation, a "faux SIM card" is provided that does not contain Subscriber Identification Module (SIM) information itself, but instead enables a user to download Electronic SIM (eSIM) information (e.g., from a network or eSIM server) which is loaded into a software emulation of a Universal Integrated Circuit Card (UICC) device. The faux card is printed with an activation code, scan pattern, or other activation or access information. The subscriber purchases the faux card, and enters the activation code into a device; the entered activation code enables the device to log onto a network, and download the appropriate eSIM data. Delivery of eSIM information as enabled by the faux card addresses deficiencies in existing SIM distribution schemes, provides users with an enhanced perception of security, and further addresses various legal requirements.

15 Claims, 6 Drawing Sheets

(51) Int. Cl.
*H04W 8/18* (2009.01)
*G06F 21/34* (2013.01)

(56) References Cited

U.S. PATENT DOCUMENTS

| | | | |
|---|---|---|---|
| 2001/0054112 A1* | 12/2001 | Nobakht et al. | 709/245 |
| 2006/0168261 A1 | 7/2006 | Serval et al. | |
| 2008/0083831 A1* | 4/2008 | Perez Lafuente et al. | 235/492 |
| 2008/0260149 A1* | 10/2008 | Gehrmann | 380/247 |
| 2009/0077643 A1* | 3/2009 | Schmidt et al. | 726/6 |
| 2009/0125996 A1* | 5/2009 | Guccione et al. | 726/6 |
| 2010/0042546 A1* | 2/2010 | Humbel | 705/64 |
| 2010/0062808 A1* | 3/2010 | Cha et al. | 455/558 |
| 2010/0311468 A1* | 12/2010 | Shi et al. | 455/558 |
| 2011/0059738 A1* | 3/2011 | Waller | 455/433 |
| 2011/0059773 A1* | 3/2011 | Neumann et al. | 455/558 |
| 2011/0210171 A1* | 9/2011 | Brown et al. | 235/382 |
| 2012/0047227 A1* | 2/2012 | Haggerty et al. | 709/217 |
| 2012/0055988 A1* | 3/2012 | Qu et al. | 235/380 |
| 2012/0108294 A1* | 5/2012 | Kaul | 455/558 |
| 2012/0108295 A1* | 5/2012 | Schell et al. | 455/558 |

* cited by examiner

SIMULACRUM OF PHYSICAL SECURITY DEVICE AND METHODS

This application claims priority to U.S. Provisional Patent Application Ser. No. 61/410,298 filed Nov. 4, 2010 and entitled "SIMULACRUM OF PHYSICAL SECURITY DEVICE AND METHODS", the foregoing being incorporated herein by reference in its entirety.

This application is related to U.S. Provisional patent application Ser. Nos. 61/472,109, filed contemporaneously herewith on Apr. 5, 2011, and entitled "APPARATUS AND METHODS FOR STORING ELECTRONIC ACCESS CLIENTS", 61/472,115, filed contemporaneously herewith on Apr. 5, 2011, and entitled "APPARATUS AND METHODS FOR DISTRIBUTING AND STORING ELECTRONIC ACCESS CLIENTS", 61/407,858, filed on Oct. 28, 2010 and entitled "METHODS AND APPARATUS FOR ACCESS CONTROL CLIENT ASSISTED ROAMING", 61/407,861, filed on Oct. 28, 2010 and entitled "MANAGEMENT SYSTEMS FOR MULTIPLE ACCESS CONTROL ENTITIES", (now U.S. patent application Ser. No. 13/079,614, filed on Apr. 4, 2011, of the same title), 61/407,862, filed on Oct. 28, 2010 and entitled "METHODS AND APPARATUS FOR DELIVERING ELECTRONIC IDENTIFICATION COMPONENTS OVER A WIRELESS NETWORK", 61/407,866, filed on Oct. 28, 2010 and entitled "METHODS AND APPARATUS FOR STORAGE AND EXECUTION OF ACCESS CONTROL CLIENTS"(now U.S. patent application Ser. No. 13/080,521, filed contemporaneously herewith on Apr. 5, 2011, of the same title), now U.S. Pat. No. 8,924,715, issued on Dec. 30, 2014, 61/408,504, filed on Oct. 29, 2010 and entitled "ACCESS DATA PROVISIONING SERVICE"(now U.S. patent application Ser. No. 13/078,811, filed on Apr. 1, 2011, and entitled "ACCESS DATA PROVISIONING APPARATUS AND METHODS"), 61/409,891, filed on Nov. 3, 2010 and entitled "METHODS AND APPARATUS FOR ACCESS DATA RECOVERY FROM A MALFUNCTIONING DEVICE", 61/413,317, filed on Nov. 12, 2010 and entitled "APPARATUS AND METHODS FOR RECORDATION OF DEVICE HISTORY ACROSS MULTIPLE SOFTWARE EMULATION", and U.S. patent application Ser. Nos. 13/080,558, filed contemporaneously herewith on Apr. 5, 2011 and entitled "APPARATUS AND METHODS FOR CONTROLLING DISTRIBUTION OF ELECTRONIC ACCESS CLIENTS", 12/952,082, filed on Nov. 22, 2010 and entitled "WIRELESS NETWORK AUTHENTICATION APPARATUS AND METHODS", now U.S. Pat. No. 8,666,368, issued on Mar. 4, 2014, 12/952,089, filed on Nov. 22, 2010 and entitled "APPARATUS AND METHODS FOR PROVISIONING SUBSCRIBER IDENTITY DATA IN A WIRELESS NETWORK", now U.S. Pat. No. 8,996,002, issued on Mar. 31, 2015, 12/980,232, filed on Dec. 28, 2010 and entitled "VIRTUAL SUBSCRIBER IDENTITY MODULE DISTRIBUTION SYSTEM", and 12/353,227, filed on Jan. 13, 2009, and entitled "POSTPONED CARRIER CONFIGURATION", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of communications systems, and more particularly in one exemplary aspect, to wireless systems that allow user devices to authenticate to wireless networks (e.g., cellular networks, WLANs, WMANs, etc.) using access control clients.

2. Description of Related Technology Access control is required for secure communication in most prior art wireless radio communication systems. As an example, one simple access control scheme might comprise: (i) verifying the identity of a communicating party, and (ii) granting a level of access commensurate with the verified identity. Within the context of an exemplary cellular system (e.g., Universal Mobile Telecommunications System (UMTS)), access control is governed by an access control client, referred to as a Universal Subscriber Identity Module (USIM) executing on a physical Universal Integrated Circuit Card (UICC). The USIM authenticates the subscriber to the UMTS cellular network. After successful authentication, the subscriber is allowed access to the cellular network. As used hereinafter, the term "access control client" refers generally to a logical entity, either embodied within hardware or software, suited for controlling access of a first device to a network. Common examples of access control clients include the aforementioned USIM, CDMA Subscriber Identification Modules (CSIM), IP Multimedia Services Identity Module (ISIM), Subscriber Identity Modules (SIM), Removable User Identity Modules (RUIM), etc.

Common implementations of USIM software are based on the Java Card™ programming language. Java Card is a subset of the Java™ programming language that has been modified for embedded "card" type devices (such as the aforementioned UICC). Traditionally, the USIM performs the well known Authentication and Key Agreement (AKA) procedure, which verifies and decrypts the applicable data and programs to ensure secure initialization. Specifically, the USIM must both (i) successfully answer a remote challenge to prove its identity to the network operator, and (ii) issue a challenge to verify the identity of the network. USIM based access control is limited to only a single Mobile Network Operator (MNO) at a time.

Existing USIM solutions are hard-coded to the physical UICC card media; the subscriber needs a new UICC to change USIM operation. This can be detrimental to both MNOs and subscribers; for example, if the authentication procedures are "broken" (e.g., via malicious "hacking" or other such activities), the subscriber must be issued a new UICC, and this process is both time consuming and expensive. Moreover, for reasons described in greater detail subsequently herein, the physical UICC only contains a single USIM entity; existing solutions are not suitable for handling multiple USIM profiles within the same UICC.

However, there are several benefits stemming from the physicality of the UICC card itself. Specifically, unlike software which can be replicated easily, the card is a physical element which is more difficult to reproduce. The physical barrier to reproduction provides tangible benefits for distribution, sale, piracy, etc. For example, a would-be software pirate cannot sell multiple copies of the same SIM card. Moreover, since "cloning" or copying a SIM card is generally illegal, the one valid physical card can be distinguished from illicit clones. Similarly, vendors can use typical inventory management procedures for SIM cards e.g., purchase, store, liquidate, etc.

Moreover, some users perceive (whether correctly or not) the physical SIM card as somehow being more secure and less likely to be the subject of surreptitious copying or distribution since, inter alia, the card is ostensibly always in their possession.

Thus, improved solutions are required for more flexible distribution of subscriber identity (e.g., UMTS USIM) applications while still maintaining backward compatibility with current physical card media distribution schemes. In addition, it is desired to maintain compliance with existing legal requirements associated with purchasing access client data.

SUMMARY OF THE INVENTION

The present invention addresses the foregoing needs by providing, inter alia, apparatus and methods for user equipment to authenticate to wireless networks (e.g., cellular networks, WLANs, WMANs. etc.) using access control clients.

In a first aspect of the invention, a method for provisioning user access data is disclosed. In one embodiment, the method comprises: providing apparatus comprising a computer-readable identifier; utilizing the apparatus to obtain the identifier; using the identifier to identify user access data; and providing the user access data to a user device, the access data allowing for said user device to access a service.

In one variant, the apparatus comprises a simulacrum of an identity module of a mobile device. The simulacrum comprises e.g., a subscriber identity module (SIM) for a UMTS-compliant mobile telephony device.

In another variant, the computer-readable identifier comprises an identifier stored in a computer readable memory of the apparatus, and the act of using the identifier comprises reading the identifier from memory using the user device.

In yet another variant, the computer-readable identifier comprises a bar code disposed on an externally readable surface of the apparatus.

In a second aspect of the invention, a network provisioning apparatus (e.g., SIM provisioning server (SPS)) is disclosed.

In a third aspect of the invention, a method of operating network provisioning apparatus (e.g., SIM provisioning server (SPS)) is disclosed.

In a fourth aspect of the invention, a user device enabled for access client (e.g., eSIM) use and provisioning via a simulacrum is disclosed. In one embodiment, the device comprises a mobile smartphone having art least one wireless interface.

In a fifth aspect of the invention, a simulacrum-based device provisioning architecture is disclosed.

In a sixth aspect of the invention, a mobile communication system is disclosed.

In a seventh aspect of the invention, a virtual "storefront" entity for activating and provisioning mobile devices is disclosed.

In an eighth aspect of the invention, methods for assigning a mobile device an access client (e.g., electronic SIM) using a simulacrum are disclosed.

In a ninth aspect of the invention, methods of operating a provisioning network are disclosed.

In a tenth aspect of the invention, methods of doing business within a wireless device provisioning architecture are disclosed.

In an eleventh aspect of the invention, methods of providing secure access client (e.g., eSIM) provisioning and activation are disclosed.

In a twelfth aspect of the invention, a computer readable apparatus is disclosed. In one embodiment, the apparatus comprises a storage medium having at least one computer program disposed thereon.

Other features and advantages of the present invention will immediately be recognized by persons of ordinary skill in the art with reference to the attached drawings and detailed description of exemplary embodiments as given below.

Figure 1:
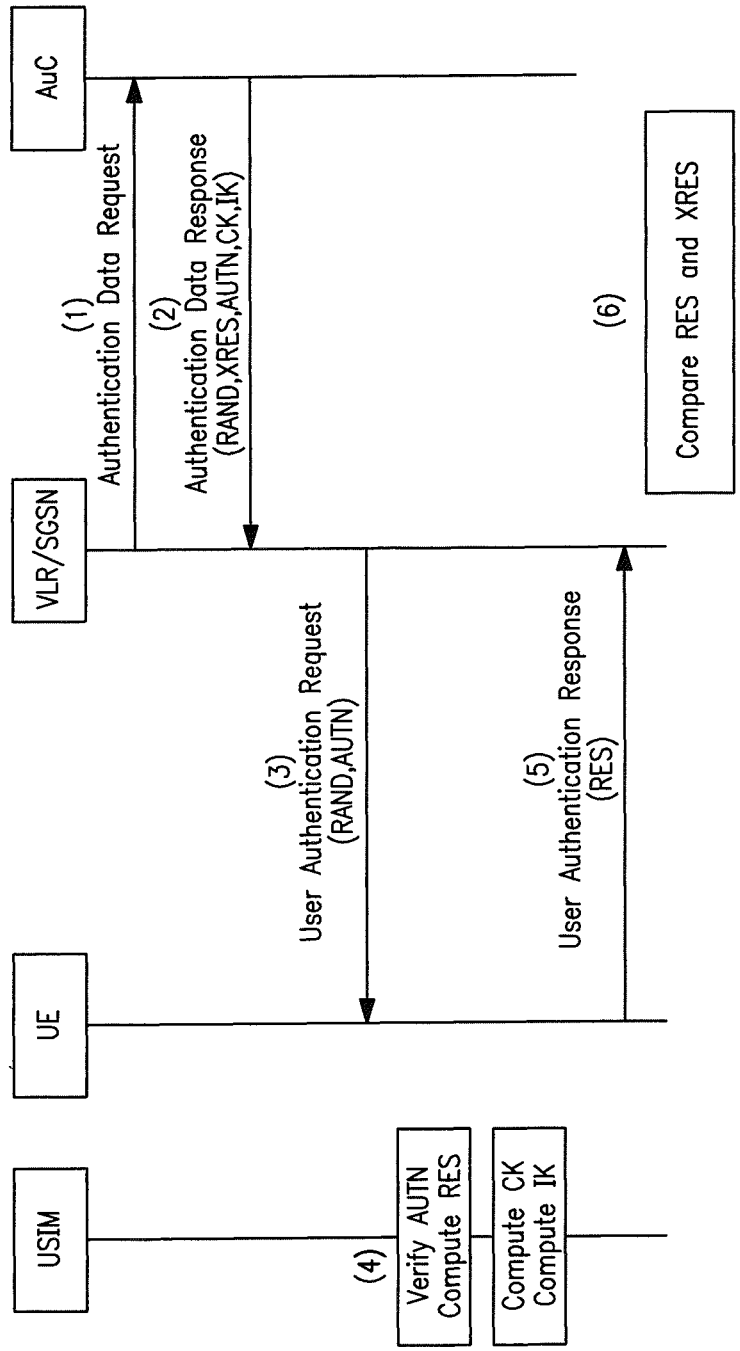
FIG. 1 illustrates an exemplary Authentication and Key Agreement (AKA) procedure using a prior art Universal Subscriber Identity Module (USIM).

All Figures © Copyright 2010 Apple Inc. All rights reserved.

DETAILED DESCRIPTION OF THE INVENTION

Reference is now made to the drawings wherein like numbers refer to like parts throughout.
Overview In one aspect, the present provides methods and apparatus for delivering an access control client to a device over a network in conjunction with a tangible representation. In one exemplary embodiment, a cellular network can securely delivery an electronic access client (e.g., electronic SIM or eSIM) to a cellular device, after the cellular device is deployed, by employing a physical security device. For example, a UICC can be manufactured for a particular network operator without having complete USIM data provisioned on it (e.g., as a "faux" card in the form of a UICC). Instead, the UICC is loaded with an identifier which is uniquely associated with second set of data (e.g. activation code) that corresponds to a particular eSIM. A cellular device equipped with the faux UICC card can download the second data or eSIM data from the network by providing or inputting the corresponding activation code.

In one implementation, the faux card comprises a SIM card faun factor device generally of the type known in the prior art, yet which contains the foregoing activation identifier. When the user or service center inserts the faux card into the device, an eSIM is provisioned to and activated on the device (such as via a download to the device over the cellular or other link), thereby allowing the user to use the device. This approach inter alia maintains backwards compatibility with existing physical card media schemes, and also allows for the provision of a tangible medium with the device (which may be desirable to device manufacturers and/or service providers, as well as giving the user the sense or perception of greater physical security), yet advantageously allows for remote provisioning and configuration of the eSIM at the time of activation.

In another implementation, the faux card is not a UICC or SIM card, but rather a "smart" card (e.g., a polymer credit-type card with an integrated circuit, such as a passive RFID device embedded therein) which is not inserted into the user device, but is rather interrogated to read out the aforementioned identifier or other data which then enables activation and provisioning of the user device.

In yet another implementation, the faux card is simply a "dumb" card which is imprinted, bar coded, or otherwise associated with unique identification information which the user (or service center) can utilize as part of the provisioning/activation process.

In another aspect of the invention, observance or maintenance of legal requirements associated with obtaining user access data is provided.

Detailed Description of Exemplary Embodiments

Exemplary embodiments of the present invention are now described in detail. While these embodiments are primarily discussed in the context of Subscriber Identity Modules (SIMs) of a GSM, GPRS/EDGE, UMTS cellular network, it will be recognized by those of ordinary skill that the present invention is not so limited. In fact, the various aspects of the invention are useful in any wireless network (whether cellular or otherwise) that can benefit from the use of device simulacra to represent virtualized data.

Prior Art Subscriber Identity Module (SIM) Operation—

Within the context of the exemplary prior art UMTS cellular network, user equipment (UE) includes a mobile device and a Universal Subscriber Identity Module (USIM). The USIM is a logical software entity that is stored and executed from a physical Universal Integrated Circuit Card (UICC). A variety of information is stored in the USIM such as subscriber information, as well as the keys and algorithms used for authentication with the network operator in order to obtain wireless network services.

Generally, UICCs are programmed with a USIM prior to subscriber distribution; the pre-programming or "personalization" is specific to each network operator. For example, before deployment, the USIM is associated with an International Mobile Subscriber Identify (IMSI), a unique Integrated Circuit Card Identifier (ICC-ID) and a specific authentication key (K). The network operator stores the association in a registry contained within the network's Authentication Center (AuC). After personalization, the UICC can be distributed to subscribers.

Referring now to FIG. 1, one exemplary Authentication and Key Agreement (AKA) procedure 100 using the aforementioned prior art USIM is illustrated in detail. During normal authentication procedures, the UE 102 acquires the International Mobile Subscriber Identifier (IMSI) from the USIM 104. The UE passes it to the Serving Network (SN) 106 of the network operator or the visited core network. The SN forwards the authentication request to the AuC of the Home Network (HN). The HN compares the received IMSI with the AuC's registry and obtains the appropriate K. The HN generates a random number (RAND) and signs it with K using an algorithm to create the expected response (XRES). The HN further generates a Cipher Key (CK) and an Integrity Key (IK) for use in cipher and integrity protection as well as an Authentication Token (AUTN) using various algorithms The HN sends an authentication vector, consisting of the RAND, XRES, CK, and AUTN to the SN. The SN stores the authentication vector only for use in a one-time authentication process. The SN passes the RAND and AUTN to the UE.

Once the UE 102 receives the RAND and AUTN, the USIM 104 verifies if the received AUTN is valid. If so, the UE uses the received RAND to compute its own response (RES) using the stored K and the same algorithm that generated the XRES. The UE passes the RES back to the SN. The SN 106 compares the XRES to the received RES and if they match, the SN authorizes the UE to use the operator's wireless network services.

Methods—

Figure 2:
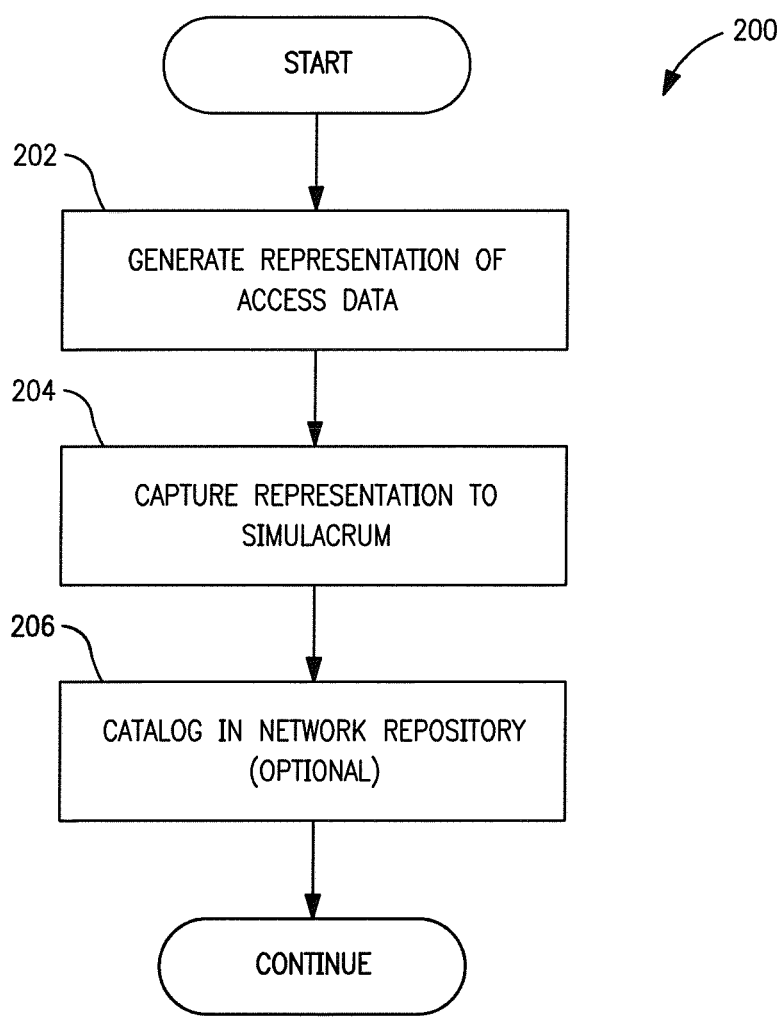
FIG. 2 is a logical flow diagram illustrating one embodiment of a method for initially providing a simulacrum of a physical security device according to the invention.

Referring now to FIG. 2, one embodiment of a generalized method for initially providing a simulacrum of a physical security device is illustrated and described.

At step 202, one or more representations of access data are generated. In one exemplary embodiment, the one or more representations of access data comprise one or more computer-readable identifiers. In one such variant, computer-readable identifiers comprise a printable indicia such as a barcode, QR code (two-dimension barcode), scan pattern, character string, etc. suitable for printing onto a physical card media.

In alternate variants, computer-readable identifiers comprise electronic indicia, such as a string of bits, bytes, or words, suitable for reading from a storage media.

In yet other variants, computer-readable identifiers may comprise electronic indicia that change over time, over use, etc. Common examples of such identifiers may include, for example a Linear Feedback Shift Register (LFSR), a state machine, a seeded mathematical transform, a digital certificate, etc. In some implementations, the computer-readable identifiers may be further scrambled, encrypted, or otherwise obfuscated, to prevent malicious or unintentional use.

In alternate implementations, the one or more representations of access data comprise one or more human-readable identifiers. Common human-readable identifiers include e.g., text indicia, strings of characters, graphical pictures, e-mail, etc. For example, human-readable identifiers may comprise a code, and/or a graphic of the intended user's face.

In some incarnations, multiple representations of access data are generated. For example, a computer-readable indicia may be coupled with a human-readable indicia to complicate replication for would-be counterfeiters. Such coupling may be implicitly or explicitly related to one another. In one "explicitly related" example (i.e., where the indicia are related directly to one another), a human-readable string could be scrambled into a computer-readable signature, etc. Would-be counterfeiters could read the human-readable string, but would not be able to reproduce the computer-readable signature.

In one "implicitly related" example (i.e., where the indicia have no apparent relation between one another), a human-readable string is associated with a computer-readable signature in a trusted database, etc.

In yet other examples, multiple representations of access data may be useful where a prospective customer is expected to purchase multiple access data. For example, multiple indicia may be generated for a multimode device, where each ones of the indicia is useful for identifying ones of the access data.

Moreover, it is noted that in some embodiments, the indicia has not been associated with access data. For example, a serial number may be generated, without a reserved eSIM. Such embodiments may be useful for "on-the-fly" eSIM provisioning, as described in greater detail hereinafter. Alternately, the indicia may already have been associated with access data; for example, an ICC-ID that is already allocated to a particular eSIM. Similarly, combinations may exist which combine fixed and run-time configurable indicia; e.g., one identifier associated with access data for home use and a second identifier which is configurable at run-time useful for roaming operation, etc.

Yet other variations can readily be substituted by one of ordinary skill, given the contents of the present disclosure.

At step 204, the one or more representations of access data are captured to a simulacrum. In one embodiment, a representation of access data is stored on the simulacrum. In an alternate embodiment, a representation of access data is printed or otherwise affixed to the simulacrum (e.g. label, printing, engraving, etc.). In yet other embodiments, multiple representations are captured on the same device. For example, a card may be printed with a human-readable string, in addition to a computer-readable barcode, internally stored identifier, etc. In still another example, a card media may be printed with multiple human-readable strings.

In some embodiments, printed or other renderings of identifiers may be made tamper-resistant to prevent unauthorized usage. For example, a printed identifier may be obfuscated with a thin "scratch" veneer, or tamper evident seal. When a customer purchases the faux card, the customer can scratch off the veneer and use the device. The veneer guarantees that the identifier has (up to the point of scratching) not been tampered with. In other examples, the printed identifier may be sealed within packaging, etc.

In one implementation of the method, the representations are unique when considered individually. A "unique" representation refers to a non-ambiguous single data element (e.g., eSIM). For example, a faux card may be individually printed with multiple unique representations, each representation uniquely identifying one access data.

In contrast, non-unique or ambiguous representations are also possible. For example, a faux card may be individually printed with one or more computer-readable identifiers, and one or more human-readable identifiers, the combination of which uniquely identify an access data. For example, a faux card may have a computer-readable ICC-ID, and multiple human-readable carrier options (e.g., AT&T™, Verizon™, Sprint™, etc.). Thus, by associating the computer-readable ICC-ID with a selected human-readable carrier option, one access data is uniquely described, etc. even though the individual identifiers themselves are ambiguous.

Additionally, in some embodiments, the representation of access data requires reserving an access data. For example, assigning an identifier (e.g., an ICC-ID, etc.) can reserve eSIM data; the identifier and eSIM data are linked within the network registry. Thereafter, the identifier will refer to the reserved eSIM data. In alternate embodiments, the representation of access data does not require reservation. For example, a faux card may be assigned an eSIM on an as-needed basis. Postponing assignation of access data to an identifier may be particularly useful where not all elements necessary to assign access data are known. For instance, prior art USIMs locked the subscriber to a particular carrier, etc. Postponement enables a subscriber to customize their eSIM (e.g., select a network carrier or carriers, etc.) Postponement is described in greater detail in U.S. Patent Publication Number 2009/0181662 filed on Jan. 13, 2009, and entitled "POSTPONED CARRIER CONFIGURATION, previously incorporated by reference in its entirety. As described therein, postponement refers in one embodiment to enabling differentiation of mobile devices for a particular telecommunications carrier at the activation stage (rather than during manufacture, etc.)

In another embodiment, the one or more representations of access data can be stored or catalogued on a network registry (step 206). In one implementation, the one or more representations are catalogued on a network registry enabling inventory management of the simulacra. For example, a "lot" of faux cards can be manufactured, with corresponding barcodes or other identifiers. Various portions of the catalogued barcodes/identifiers can be provided to respective ones of multiple eSIM vendors. Portioning of eSIMs is desirable for efficiency (e.g., eSIMs are generated on an as-needed basis), and multi-sourcing (e.g., multiple eSIM vendors can be interchangeably used, to prevent monopolistic practices, etc.).

Cataloging of representations and their corresponding simulacra may also be used for detecting and preventing fraudulent, malicious, and/or surreptitious use. As previously discussed, cross-verification of the various identifiers may help identify fraudulent or compromised simulacrum. In one exemplary scenario, one or more computer-readable indicia may be coupled with one or more human-readable indicia to complicate replication for would-be counterfeiters. Missing, different, corrupted, or additional indices indicate abnormal operation, and can flag fraudulent behavior.

Further still, cataloging of representations to access data may be used to allow authorized retrieval of the access data if the simulacrum itself is lost. For example, if a faux card associated with an eSIM is destroyed or lost, the owner of the card can request the generation of a new card, based on the information stored within the network repository. Moreover, the replacement card may not be identical in all aspects, such as aspects other than those noticed by the user. For example, differences in access data elements such as state, computer-readable identifiers, etc. do not affect the user, and may be changed to ensure security. However, user-specific access data may be gleaned from the registry contents, and then automatically configured for the replacement card.

Figure 3:
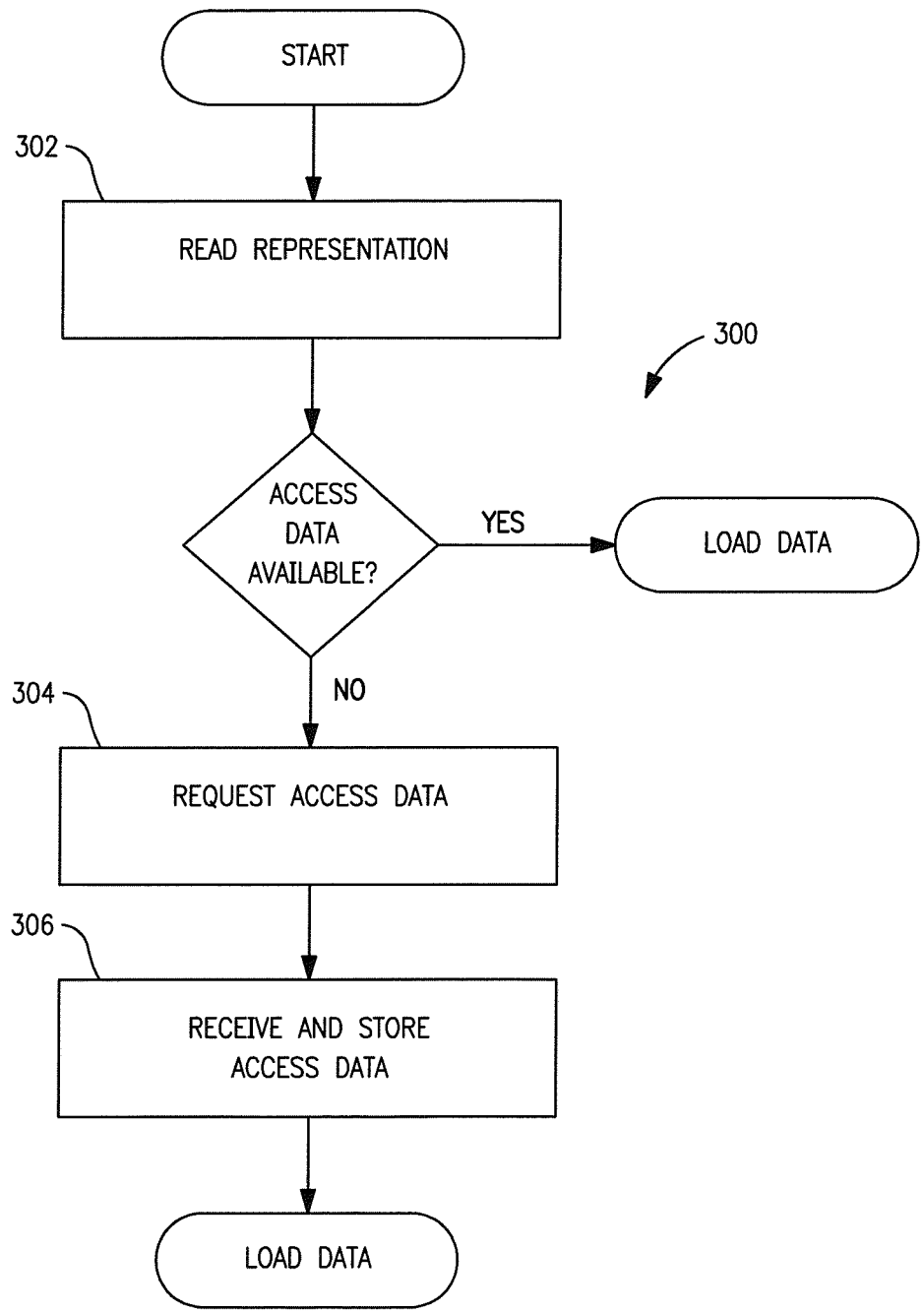
FIG. 3 is a logical flow diagram illustrating one embodiment of the method for using a simulacrum within a device according to the invention.

Now referring to FIG. 3, one embodiment of a generalized method for using a simulacrum within a device is illustrated.

As shown per step 302, a target device reads one or more representations of access data from a simulacrum. In one exemplary embodiment, the simulacrum is a physical card form factor which is inserted within the device. For example, a faux card having the form factor of a comparable UICC is inserted within an appropriately enabled mobile device. The device may optionally employ card insertion detection to determine the presence of the faux card. In one such variant, the faux card uses a pull-up or pull-down resistor between two voltage rails (e.g., power and ground), the change in voltage indicative of card insertion. In other such variants, the faux card detects card presence based on mechanical insertion e.g., depressing a switch, blocking a light beam, breaking an electrical connection, etc. In yet other variants, insertion of the card connects two otherwise disconnected leads. Yet other methods for card detection will be recognized by those of ordinary skill given the present disclosure.

In alternate embodiments, the simulacrum is scanned or read by the device. In one such embodiment, scanning comprises scanning a barcode (e.g., via a camera, or other optical capture apparatus). It is noted that the scanning apparatus may be indigenous to the device itself (e.g., a smartphone camera), or may be external to the device (e.g., a third-party or external device, which is communication with the target device, as discussed below). In other embodiments, scanning comprises reading an electrical circuit, such as a memory, state machine, shift register, etc. In yet other embodiments, scanning comprises a radio frequency scan, such as via RFID, short range wireless protocols such as NFC (ISO 14443), etc.

In yet other alternate embodiments, the simulacrum is entered by human interface. For example, for cards with human-readable text printed thereon, the simulacrum is added to the device by the user via a graphical user interface or other type of input device.

Moreover, while the foregoing examples are based on the target device reading or capturing the representations of access data, it is appreciated that other (e.g., reader) devices may read the actual simulacrum, providing the appropriate representation to the device. For example, in one such example, a subscriber enters the identifier on their personal computer. The personal computer provides the identifier to the device, over a docking link. In another such example, a customer service representative may read a card within a card reader; thereafter, the card reader provides the appropriate identifier to the device via wireline or wireless interface.

Still other combinations of the foregoing and/or alternate methods for reading access data from a simulacrum will be appreciated by ones having ordinary skill in the related arts, given the contents of the present disclosure.

In various incarnations, the device may further verify the validity of the read or captured information. For example, the read information may include self-evident fraud detection, such as cross-referencing identifiers, digital encrypted signatures, digital watermarking or other steganographic techniques, cryptographic (e.g., one-way) hashes, checksums, etc. Invalid information may either overtly or discretely flag an error, abort operation, or disable the device.

At step 304, if the device does not have the access data corresponding to the one or more read representations, then the device requests the access data. If the access data is resident to the device, then in one embodiment the device uses the resident copy.

The device checks the read representation among its internal records to determine if the associated access data is already stored internally. In one variant, the device will only request access data if it does not already have associated access data. For example, the device may have previously downloaded access data, the card insertion being used merely to enable the use of the access data. In other variants, the device may request access data corresponding to the representation a new, to ensure that access data remains "fresh". In yet other variants, the device may request user intervention to determine appropriate action.

The request for access data can also be initiated manually by the user of the wireless device. For example, in embodiments where multiple access data is possible (e.g., a user has a choice over one or more eSIMs, etc.), the user selects one access data (or a set of complementary eSIM for multiple users). Thereafter, the device requests access data for the selected one(s). In another such example, where access data has not yet been assigned to the simulacrum (e.g., where access data assignment has been postponed), a user interface may enable a user to complete information necessary for generating the access data. Such information may comprise for example accounting information, selection of a carrier, personal identifying information, etc.

In other embodiments, the request for access data corresponding to the one or more read/captured representations is initiated automatically by the device. For example, for simulacrum that embody only a single representation of access data, the device may automatically request the access data. In other implementations, a device may preferentially select one of the representations based on e.g., business concern, user preference, device type, etc. For example, a device with multiple options may select the option most economical for the user. In yet other implementations, a device with multiple options may select the option most likely to enable application burden (e.g., the most advanced available network, etc.)

It will be recognized that a simulacrum can in fact represent multiple different profiles, thus enabling different profiles for different devices (possibly of different capabilities) without requiring the user to know the difference, or manage different cards, etc. For example, if a UE determines that no eSIM data has been downloaded for an inserted faux UICC card, then the UE automatically requests and initiates the download of eSIM data. In another example, if a UE determines that no eSIM data has been downloaded for an inserted faux UICC card, the UE Graphical User Interface (GUI) asks the user to input information such as: an activation code associated with the inserted card, account information, desired service plan, etc. Upon successful completion, the UE sends the input information to request access data information.

Various systems for requesting and receiving access data are envisioned for use consistent with the invention. In one embodiment, the delivery mode is a wireless network (e.g., cellular, WLAN, PAN, or WMAN). Common examples of such wireless technologies include without limitation Global System for Mobile Communication (GSM), Interim Standard 95 (IS-95), Interim Standard 2000 (IS-2000), 3GPP/3GPP2, Universal Mobile Telecommunication System (UMTS), Long Term Evolution (LTE), Long Term Evolution Advanced (LTE-A), Worldwide Interoperability for Microwave Access (WiMAX), Wireless Local Area Network (WLAN), Bluetooth, etc.

For example, in one embodiment, access data can be delivered to a cellular device over a wireless network via a local carrier update portal. See, e.g., the exemplary secure transfer scheme as described in co-owned U.S. Provisional Patent Application Ser. No. 61/407,866 filed on Oct. 28, 2010 and entitled "METHODS AND APPARATUS FOR STORAGE AND EXECUTION OF ACCESS CONTROL CLIENTS", previously incorporated herein. As described therein, secure sessions can be established between the mobile device and the local carrier update portal, enabling secure transmission of access data. Artisans of ordinary skill will appreciate that the foregoing scheme is merely illustrative; substitution with other analogous schemes can readily be made given the contents of the present disclosure.

In another exemplary embodiment, the wireless device is hard-coded with a cryptographic public/private key pair (e.g., Rivest, Shamir and Adleman (RSA) algorithm) that is stored in a physically protected secure element of the software entity e.g., the eUICC. Additionally, the authenticity of the eUICC and the secrecy of the private key is further attested to by a trusted entity that has issued an "endorsement" certificate for the eUICC key pair. One example of a trusted entity may be e.g., the device manufacturer, a network operator, etc.

As a brief aside, a public/private key pair includes a secret private key, and a published public key. A message encrypted with the public key can only be decrypted using the proper private key. Public/private key schemes are considered "asymmetric", as the key used to encrypt and decrypt are different, and thus the encrypter and decrypter do not share the same key. In contrast "symmetric" key schemes utilize the same key (or trivially transformed keys) for both encryption and decryption. The Rivest, Shamir and Adleman (RSA) algorithm is one type of public/private key pair cryptography that is commonly used within the related arts, but it will be recognized that the present invention is in no way limited to the RSA algorithm or in fact asymmetric techniques.

Since the device key pairs are asymmetric, the public keys can be distributed without compromising the integrity of the private keys. Accordingly, the device key and certificate can be used to protect and verify the communication between previously unknown parties (e.g., the mobile device, and the local carrier update portal).

For example, the mobile device provides its public key and an endorsement certificate to the local carrier update portal. The local carrier update portal verifies the endorsement certificate (e.g., verification with the trusted entity that issued the certificate, etc.). If the endorsement certificate is valid, the local carrier update portal transmits a vendor certificate, and a session key to the mobile device, where the session key is further encrypted by the wireless device's public key. The wireless device verifies the vendor certificate and decrypts the session key with its private key. If the vendor certificate is valid, then the wireless device accepts the session key.

Successful completion of the foregoing exchange ensures that both wireless device and the local carrier update portal are legitimate, and now have a shared session key. The shared session key is used to conduct a secure session between the wireless device and the local carrier update portal.

Accordingly, after the secure session has been established, the wireless device may transmit the request to retrieve the stored user access data by transmitting data packages containing the first and second representations of user access data.

In alternate embodiments, the delivery is conducted over a wireline network. In one variant, the wireline network comprises an internet (e.g., broadband DOCSIS, DSL, T1, ISDN, etc.) connection. For example, one mode of delivery may utilize online stores (such as the iTunes™ developed and operated by the Assignee hereof or comparable). Access data can be delivered to an online store application executing on a subscriber's personal computer, the access data is then transferred to the device during standard docking procedures. Alternately, the access data can be pushed to the device via a local area network operated or otherwise serving the personal computer.

Lastly, at step 306, the access data is received at the target device and stored thereon (or on a designated associated storage device).

Figure 4:
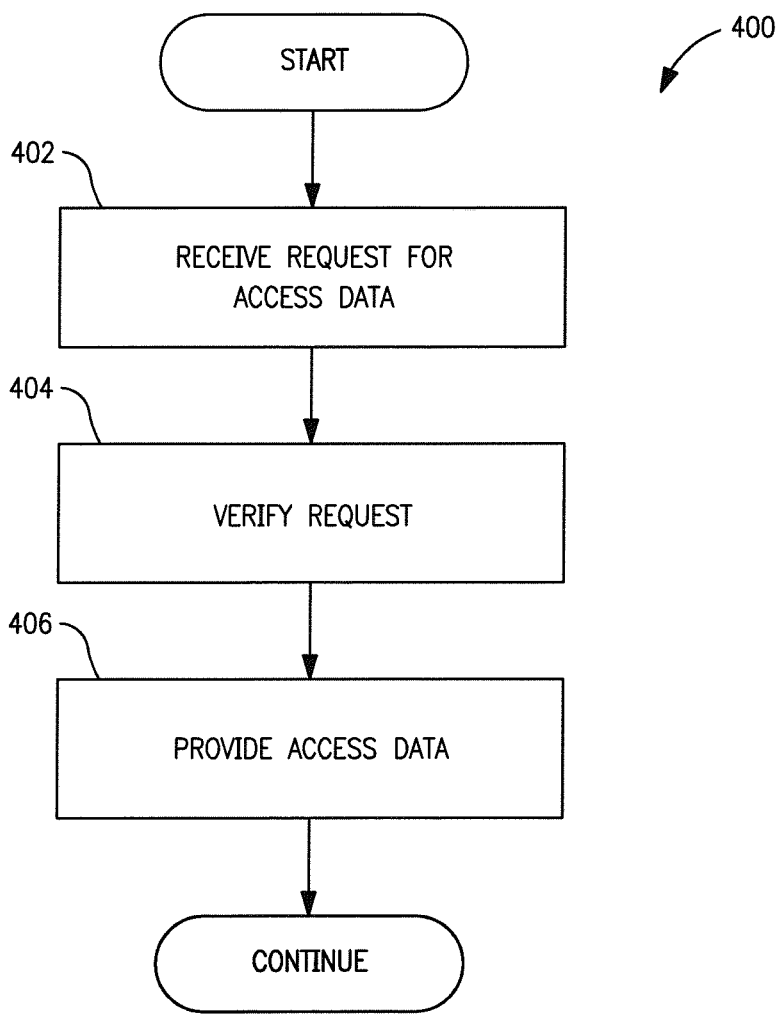
FIG. 4 is a logical flow diagram illustrating one embodiment of a generalized method for providing an access control client according to the invention.

Now referring to FIG. 4, one embodiment of a generalized method for providing an access control client is illustrated.

As shown in step 402, a request is received for one or more access control clients. In one exemplary embodiment a SIM (Subscriber Identity Module) provisioning server (SPS) (such as that described in co-owned U.S. Provisional Patent Application Ser. No. 61/408,504 filed on Oct. 29, 2010 and entitled "ACCESS DATA PROVISIONING SERVICE", previously incorporated herein) receives a request from a wireless device, or from a client server.

At step 404, the request is verified and/or authorized. In one embodiment, the entity verifies that the request is a legitimate request. For example, verification of the received request may help identify fraudulent or compromised simulacrum. In one exemplary example, if the request is does not match the network registry (e.g., a set of identifiers is missing one or more identifiers, has different identifiers, has one or more corrupted identifiers, or includes additional identifiers), then the request is flagged as an abnormal or mis-formed request, and can be used to detect fraudulent behavior.

In other examples, the request includes one or more signatures or certificates which can be independently verified to identify malicious behavior.

In yet other embodiments, even where the request is legitimate, the request is authorized before being fulfilled. For example, where the billing information is incorrect, incomplete, or rejected, the request may be denied. In other example, where the request is for a service which is not offered, not available, etc. the request may be denied. Still other considerations may be current network load, legal requirements, etc.

If the request is verified and authorized then, the entity either provides the existing access data associated with the request, or generates access data to fulfill the request (step 406).

Referring now to step 406, the entity provides the access control client associated with the request to the device. The entity retrieves the access control client from the network registry, updates the corresponding status changes, and provides the access control client to the device. Alternately, the entity generates the access control client according to the request. Once generated, the entity updates the network registry, and provides the access control client to the device. As previously described, delivery can be conducted over a wireless network, or alternately a wireline network. In one variant, the update is performed over a secure session established between the device and the entity.

Those having ordinary skill in the related arts will recognize that various business rules may be implemented in accordance with various aspects of the present invention. For example, in one exemplary embodiment, a stand-alone SPS may be managed by a service intermediary; this service intermediary may comprise a device manufacturer partnered to one or more MNO's, yet commanding a premium for access to the eSIM distributed from the SPS. Pricing structures may be derived on e.g., a per eSIM basis, such as where each subscriber must pay a premium for each eSIM it is given access to. It is appreciated that more advanced eSIM, such as those which are able to be used on more than one device, those that maybe be used simultaneously on more than one device, and/or smart eSIM may be offered at a higher premium than other eSIM. It is further appreciated that certain features discussed herein, such as the wallet UE feature, may be structured to require advanced or upgraded subscriptions.

Still further, it is appreciated that the client server may be managed by the aforementioned service intermediary (such as a device manufacturer) and provides mechanisms and business rules eSIM access. In one embodiment, a user may purchase a "faux UICC card" to request post- or pre-paid access to network, then via the Internet or other communication network, may download the correspond eSIM to their device. The service intermediary performs many of the functions of an MNO (such as by managing billing, etc.) according to this embodiment.

Additionally, rules may be implemented to allow for updating eSIM data associated with a particular "faux UICC card". In one embodiment, if user access data is comprised, the SPS can be updated with new eSIM data for the user to download while deactivating the comprised eSIM. This would allow a user to receive a new eSIM without having to replace the physical UICC card. It is appreciated not requiring a new physical card increases convenience to a user needing new eSIM data while reducing operating costs by negating the need to manufacturer and provide a new UICC.

SIM Provisioning Server (SPS)—

Figure 5:
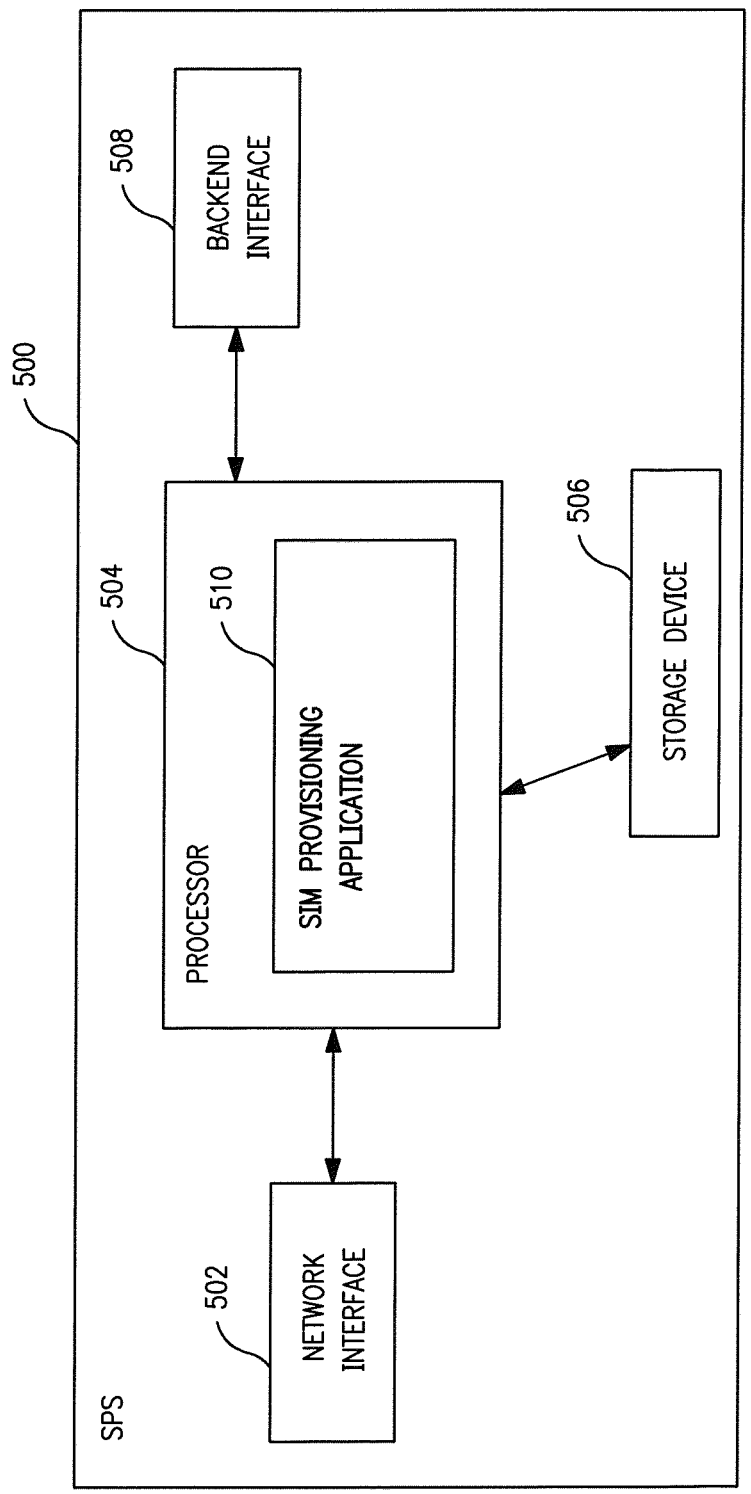
FIG. 5 is a block diagram of an exemplary embodiment of an SIM (Subscriber Identity Module) provisioning server (SPS) apparatus according to the invention.

FIG. 5 illustrates one exemplary embodiment of an SPS 500 useful with the present invention. As discussed above, the SPS may comprise a stand-alone entity or may be disposed within a trusted network entity, or assume yet other configurations. As shown, the SPS generally includes a network interface 502 for interfacing with the communications network, a processor 504, a storage apparatus 506, and various back end interfaces 508. Other interfaces may also be utilized, the foregoing being merely illustrative. The back end interface 508 enables the SPS to communicate with one or more MNO or trusted network entities.

In the illustrated embodiment, the SPS 500 includes at least a SIM provisioning application 510 running on the processor 504 thereof. Although illustrated as a single application running on the SPS, it is appreciated that the foregoing SIM provisioning functionality may comprise a distributed application running on a plurality of entities in data communication with one another.

The SIM provisioning application 510 receives communications from a target device such as (i) a communication requesting that a particular eSIM be allocated to the target device, (ii) a communication requesting access to one or more eSIM stored thereon. The SIM provisioning application 510 is also responsible for verifying the above requests to ensure these are received from authorized entities and there are no security concerns.

When a user or device requests an eSIM from the SPS 500, the SIM provisioning application 510 is responsible for determining the current status of the requested eSIM as well as whether the requested eSIM may be provided. The determination of whether an eSIM is available and may be provided may be specific to the requesting subscriber or device, and/or to the requested eSIM. For example, the SIM provisioning application may be configured to query network entities (such as billing entities, etc.) to determine a service level or tier for a requesting user or device. This information may then be utilized to determine whether the requesting user or device may access the requested eSIM. Alternatively, the SIM provisioning application may simply receive rules for each eSIM from a separate entity (such as the entity which generates the eSIM, or another network entity charged with making the aforementioned determinations), either in response to a query or automatically.

Lastly, the SIM provisioning application 510 may optionally generate notifications to a system administrator in the instance that it is believed that an illegal or unauthorized, copy of an eSIM has been created and/or distributed.

Exemplary User Apparatus—

Figure 6:
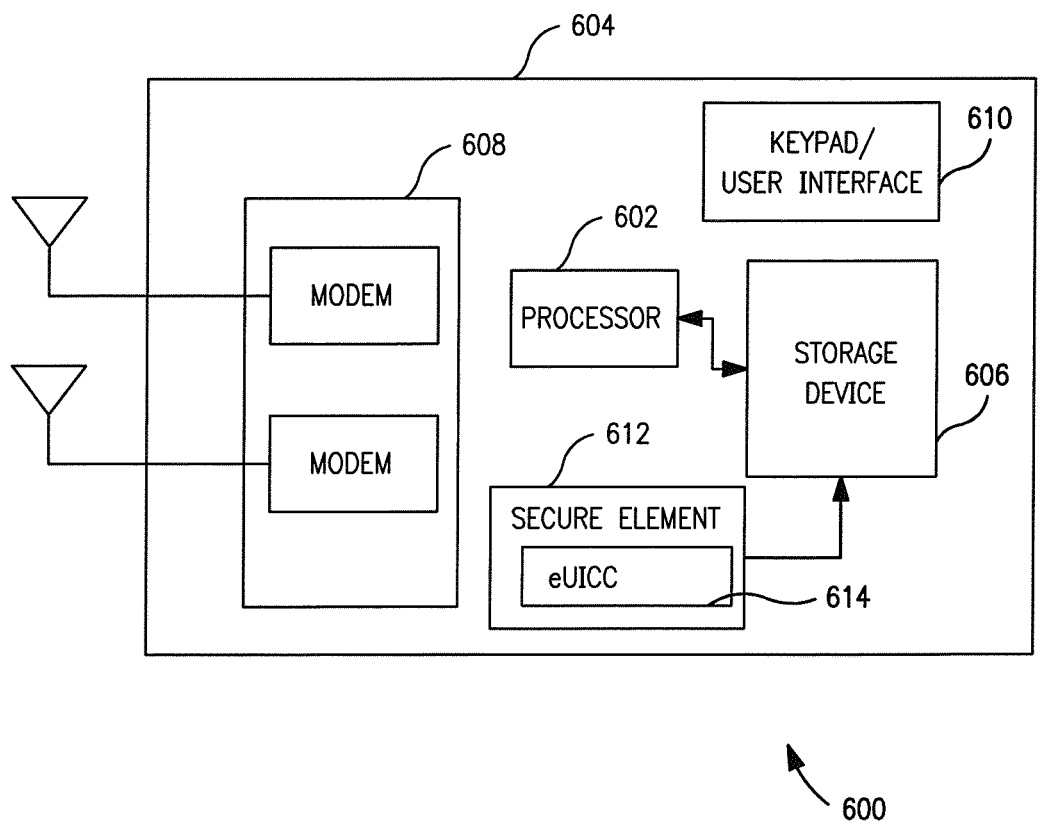
FIG. 6 is a block diagram illustrating an exemplary embodiment of a user device according to the invention.

Referring now to FIG. 6, one exemplary embodiment of apparatus useful for implementing the methods of the present invention is illustrated.

The exemplary user device (e.g., UMTS equipment or "UE") 600 of FIG. 6 is a wireless device with a processor subsystem 602 such as a digital signal processor, microprocessor, field-programmable gate array, or plurality of processing components mounted on one or more substrates 604. The processing subsystem may also comprise an internal cache memory. The processing subsystem is connected to a memory subsystem 606 comprising memory which may for example, comprise SRAM, flash and SDRAM components. The memory subsystem may implement one or a more of DMA type hardware, so as to facilitate data accesses as is well known in the art. The memory subsystem contains computer-executable instructions which are executable by the processor subsystem.

In one exemplary embodiment of the present invention, the device can comprise of one or more wireless interfaces 608 adapted to connect to one or more wireless networks. The multiple wireless interfaces may support different radio technologies such as GSM, CDMA, UMTS, LTE/LTE-A, WiMAX, WLAN, Bluetooth, etc. by implementing the appropriate antenna and modem subsystems.

The user interface subsystem 610 includes any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card-type client embodiments may lack a user interface (as they could piggyback onto the user interface of the host device to which they are physically and/or electrically coupled).

In some embodiments, the exemplary device also includes I/O necessary to scan, read, or otherwise determine an identifier. In one such variant, the I/O comprises a digital camera and associated software, suitable for reading a printed indicia. In other variants, the I/O comprises a digital scanner comprising a light (e.g., laser), and light sensor, adapted to read a barcode or other form of computer-readable indicia. Yet other variations are readily appreciated by an artisan having ordinary skill when provided the present disclosure.

In the illustrated embodiment, the device includes a secure element 612 which contains and operates the eUICC application 614. The eUICC is capable of storing and accessing a plurality of access control clients, where the access control clients are configured to authenticate the user to a respective network. The secure element is accessible by the memory subsystem 606 at the request of the processor subsystem 602. The secure element may also comprise a so-called "secure microprocessor" or SM of the type well known in the security arts.

Example Operation—

Various aspects of the present invention are now discussed with respect to one exemplary implementation. In the context of the exemplary embodiment of the present invention, instead of using a prior art SIM card, the UICC is emulated as a virtual or electronic entity such as e.g., a software application, hereafter referred to as an Electronic Universal Integrated Circuit Card (eUICC), that is contained within a secure element (e.g., secure microprocessor or storage device) in the UE. The eUICC is capable of storing and managing multiple SIM elements, referred hereafter as Electronic Subscriber Identity Modules (eSIM). Each eSIM contains the same data of a typical SIM. The eUICC selects an eSIM based upon the eSIM's ICC-ID. Once the eUICC selects the desired eSIM(s), the UE can initiate an authentication procedure to obtain wireless network services from the eSIM's corresponding network operator. The SIM application generally encompasses access control clients such as the aforementioned USIM, CSIM, ISIM, SIM, RUIM, etc. It is further understood that each eSIM is associated with a user account, thus an "eSIM" may broadly encompass multiple access control clients (e.g., a user may have a USIM, and a SIM associated with the same eSIM account).

Accordingly, embodiments of the present invention replace prior art SIM cards with a physical card likeness or simulacrum. Specifically, the simulacrum in the present context comprises a physical representation of the SIM card media, but does not contain the actual eSIM logical entity. Instead, the simulacrum is marked with an indication as to the logical eSIM entity associated therewith. For example, in one exemplary embodiment, the simulacrum is a SIM card form factor having electrical contacts, a polymer outer case or body, and a PROM or other such storage device within and in electrical communication with the contacts. When the user or service person inserts the faux SIM card into the user device (e.g., smartphone), logic within the user device interrogates or reads the faux SIM card (much as a conventional card) via the terminals so as to extract the identification or access data present in the storage device. The user device then establishes contact with an eSIM provisioning entity (e.g., over one of the indigenous radio or wireline interfaces of the user device), the latter which is provided with the read identification/access data via the interface. When the data is authenticated by the entity (which may be e.g., a remote server or the like), the eSIM is generated and provisioned for the requesting user device, and ultimately an account set up with a designated service provider.

In another implementation, the simulacrum is a small plastic or cardboard "card", having a label or other machine- or human-cognizable rendering affixed thereto or imprinted thereon. The rendering, when scanned or otherwise read, identifies a corresponding eSIM (e.g., stored within a SIM Provisioning Server (SPS), etc.). In some variants, the scanning may trigger the generation of a corresponding eSIM. The identified (or generated) eSIM is programmed into the eUICC.

Similar to prior art SIM card distribution, the simulacrum of the present invention helps ensure that distribution of eSIMs is limited to entities in possession of the physical card. Moreover, as described supra, use of the simulacrum enables legacy inventory management, and/or subscriber interface. However, in addition to the benefits offered by the "physicality" of the simulacrum, the simulacrum does not detract from the benefits associated with a virtualized eSIM. For example, the eSIM identified by the simulacrum is not hard-coded, and thus the eSIM can be updated or dynamically changed without requiring a replacement physical card. For instance, when the simulacrum is moved to a new device, the new device downloads the eSIM associated with the simulacrum (including optionally its most recent updates). Similarly, the simulacrum can be associated with more than one eSIM. For example, a vendor may consolidate multiple eSIMs (either as a preset bundle, or according to customer requirements) under a single simulacrum. Thereafter, the simulacrum references multiple eSIMs.

While the foregoing methods and apparatus for providing a tangible representation of a virtualized access control device it is readily appreciated by those of ordinary skill, that other schemes may be similarly substituted. For example, in other variants, the electronic identification information may be physical disposable card (e.g., a gift card, or other token, etc.)

Legal Compliance—

In another aspect of the invention, observance or maintenance of legal requirements associated with obtaining user access data is provided. For example, many countries require that a user provide a valid form of personal identification when purchasing a user access data (e.g. SIM card, UICC card). Accordingly, by requiring a physical UICC to access and download eSIM data, legal compliance is maintained, because user identification may still be verified upon purchasing the "faux UICC card".

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for provisioning electronic Subscriber Identity Modules (eSIMs) to user devices, the method comprising:
at an eSIM provisioning server:
receiving, from a user device, a unique identifier, wherein:
the user device is configured to access a removable apparatus that is configured to be inserted into a receiving bay included in the user device,
the removable apparatus includes a computer-readable memory that stores the unique identifier but not an eSIM, and
the unique identifier corresponds to:
(i) a particular eSIM stored within a database that is accessible to the provisioning server, and
(ii) the removable apparatus;
identifying, based on the unique identifier, the particular eSIM within the database, wherein the particular eSIM is associated with a particular service provider; and
providing, to the user device, the particular eSIM, wherein the user device stores the particular eSIM into a secure element that is distinct from the removable apparatus and included in the user device, and the particular eSIM enables the user device to operate with the particular service provider.

2. The method of claim 1, wherein the removable apparatus is a simulacrum of an identity module that is configured to interface with a mobile device.

3. The method of claim 2, wherein the simulacrum is a faux subscriber identity module (SIM) card for a Universal Mobile Telecommunications System (UMTS)-compliant mobile telephony device.

4. The method of claim 1, wherein the computer-readable memory is embedded within the removable apparatus.

5. The method of claim 4, wherein the computer-readable memory is substantially tamper-proof within the removable apparatus by way of a physical seal.

6. The method of claim 1, wherein the unique identifier is readable via a short range wireless protocol.

7. The method of claim 1, wherein a value of the unique identifier is based on a current time.

8. An apparatus, comprising:
a network interface;
a processor;
a bay configured to receive a simulacrum of an identity module for the apparatus, wherein:
the simulacrum includes a non-volatile memory that stores a unique identifier that corresponds to (i) an electronic Subscriber Identity Module (eSIM), and (ii) the simulacrum of the identity module for the apparatus, and
the eSIM is not stored in the non-volatile memory;
a secure element, wherein the secure element includes a memory that is distinct from the non-volatile memory of the simulacrum; and
a storage device in data communication with the processor, wherein the storage device stores computer-executable instructions that, when executed by the processor, cause the apparatus to:
read the unique identifier from the non-volatile memory;
request, from a server, the eSIM associated with the unique identifier;
receive, from the server, the eSIM;
store the eSIM into the secure element; and
using the eSIM, configure the network interface for operation.

9. The apparatus of claim 8, wherein the simulacrum is a faux subscriber identity module (SIM) card for a Universal Mobile Telecommunications System (UMTS)-compliant mobile telephony device.

10. The apparatus of claim 8, wherein a value of the identifier is based on a current time.

11. The apparatus of claim 8, wherein a value of the unique identifier changes in correlation to a number times the unique identifier has been accessed.

12. A method for provisioning electronic Subscriber Identity Modules (eSIMs) to mobile devices, the method comprising:

at an eSIM provisioning server:

receiving, from a mobile device, a request for an eSIM that corresponds to a unique identifier, wherein:

the unique identifier is embedded within an identity module that is configured to be inserted into a receiving bay that is included in the mobile device, the eSIM is not embedded within the identity module, and the unique identifier further corresponds to the identity module;

establishing a secure session with the mobile device; and providing, to the mobile device, the eSIM, wherein the mobile device stores the eSIM into a secure element that is distinct from the identity module and included in the mobile device, and the eSIM enables the mobile device to operate with a particular service provider.

13. The method of claim 12, wherein the identity module is a simulacrum of a Subscriber Identity Module (SIM) card that includes a non-volatile memory, and the unique identifier is stored within the non-volatile memory.

14. The method of claim 13, wherein a value of the unique identifier is based on a current time.

15. The method of claim 13, wherein a value of the unique identifier changes in correlation to a number times the unique identifier has been accessed.

* * * * *